(12) United States Patent
Pratt et al.

(10) Patent No.: US 10,540,698 B2
(45) Date of Patent: Jan. 21, 2020

(54) USER PURCHASE PROFILING FROM ELECTRONIC PURCHASE CONFIRMATION MESSAGES

(71) Applicant: AT&T Intellectual Property I, L.P., Atlanta, GA (US)

(72) Inventors: James H. Pratt, Round Rock, TX (US); Wiley Wilkins, Ivanhoe, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 329 days.

(21) Appl. No.: 15/442,915

(22) Filed: Feb. 27, 2017

(65) Prior Publication Data

US 2018/0247354 A1    Aug. 30, 2018

(51) Int. Cl.
*G06Q 30/00* (2012.01)
*G06Q 30/06* (2012.01)
(Continued)

(52) U.S. Cl.
CPC ..... *G06Q 30/0601* (2013.01); *G06Q 30/0631* (2013.01); *G06Q 30/0641* (2013.01);
(Continued)

(58) Field of Classification Search
None
See application file for complete search history.

(56) References Cited

U.S. PATENT DOCUMENTS 6,898,598 B2  5/2005  Himmel et al.
7,843,964 B1 * 11/2010 Croak ................. H04L 12/5691
                                                 370/395.21
(Continued)

FOREIGN PATENT DOCUMENTS

| AU | 2012238211 A1 | 1/2014 |
| WO | 2009154867 A2 | 4/2010 |
| WO | 2016179543 A1 | 11/2016 |

OTHER PUBLICATIONS

"Receipt Recognition", Agitare Technologies, agitaretech.com, Jan. 29, 2017 https://web.archive.org/web/20170129172405/http://www.agitaretech.com/products/receiptrecognition/.
(Continued)

*Primary Examiner* — William J Allen
*Assistant Examiner* — Maria S. P. Heath (57) ABSTRACT

A method may include a processor obtaining an authorization to identify electronic purchase confirmation messages in a plurality of electronic messages for a user and to maintain a user purchase profile of the user. The processor may collect the plurality of electronic messages for the user, identifying the electronic purchase confirmation messages in the plurality of electronic messages, and determine a purchase category and a purchase amount from each of the electronic purchase confirmation messages that is identified. The processor may further obtain a verification of the purchase category that is determined from each of the electronic purchase confirmation messages that is identified, update the user purchase profile in accordance with the purchase category and the purchase amount from each of the electronic purchase confirmation messages that is identified, and perform an automated action in accordance with the user purchase profile that is updated.

20 Claims, 5 Drawing Sheets

(51) Int. Cl.
*H04L 12/801* (2013.01)
*H04L 12/927* (2013.01)
*H04L 12/26* (2006.01)
*G06Q 30/02* (2012.01)

(52) U.S. Cl.
CPC .............. *H04L 43/00* (2013.01); *H04L 47/10* (2013.01); *H04L 47/80* (2013.01); *G06Q 30/0224* (2013.01)

(56) References Cited

U.S. PATENT DOCUMENTS

| | | | |
|---|---|---|---|
| 8,468,064 | B1 | 6/2013 | Trandal et al. |
| 8,527,436 | B2 | 9/2013 | Salaka et al. |
| 8,612,317 | B1 | 12/2013 | Harman et al. |
| 8,666,812 | B1 | 3/2014 | Gandhi |
| 9,087,426 | B2 | 7/2015 | Shiftan et al. |
| 9,519,928 | B2* | 12/2016 | Calman .............. G06Q 30/0631 |
| 9,563,904 | B2 | 2/2017 | Mastierov et al. |
| 9,563,915 | B2 | 2/2017 | Brady et al. |
| 9,949,123 | B2* | 4/2018 | Henderson .......... H04L 65/1076 |
| 9,979,617 | B1* | 5/2018 | Meyer .................... H04L 47/70 |
| 2007/0164106 | A1 | 7/2007 | McDevitt et al. |
| 2009/0228340 | A1 | 9/2009 | Bohannon |
| 2011/0087592 | A1* | 4/2011 | van der Veen ......... G06Q 20/12 705/44 |
| 2012/0221446 | A1 | 8/2012 | Grigg et al. |
| 2012/0290609 | A1 | 11/2012 | Britt |
| 2013/0024282 | A1 | 1/2013 | Kansai et al. |
| 2014/0095985 | A1 | 4/2014 | Argue et al. |
| 2014/0180872 | A1 | 6/2014 | Gura et al. |
| 2014/0244453 | A1 | 8/2014 | Rephlo |
| 2015/0046307 | A1 | 2/2015 | Calman et al. |
| 2015/0371339 | A1 | 12/2015 | Pastore et al. |
| 2016/0125317 | A1* | 5/2016 | Benjamin .............. G06Q 30/02 706/12 |

OTHER PUBLICATIONS

"Make expensing easy with Email Receipts!", Zoho blog, zoho.com, Jul. 25, 2016 https://www.zoho.com/expense/blog/makeexpensingeasywithemailreceipts.html.

"Automated Email Activity Management: An Unsupervised Learning Approach", BookSC, booksc.org, Nov. 22, 2004 http://booksc.org/book/22490822.

"Extracting Product Information from Email Receipts Using Markov Logic", Amazon Web Services, amazonaws.pdf, Jun. 17, 2009 http://ai2s2-pdfs.s3.amazonaws.com/23ee/61784e2979fa7665f9d21fa00f8fbaf5c7bf.pdf.

* cited by examiner

USER PURCHASE PROFILING FROM ELECTRONIC PURCHASE CONFIRMATION MESSAGES

The present disclosure relates generally to identifying electronic purchase confirmation messages in a plurality of electronic messages for a user, and more particularly to updating a user purchase profile of the user based upon purchase categories and purchase amounts that are determined from the electronic purchase confirmation messages, and performing an automated action in accordance with the user purchase profile.

BACKGROUND

Consumers and business make purchases from various types of vendors across the Internet. E-commerce has become the default way to do business, even with local and small businesses. In addition, it is common in the retail industry to track customer purchases over time for both online and in-person transactions. In some cases, the tracking of customer purchases by a retailer may be shared with a customer. However, the access to and use of such information by the customer may be limited, and the needs and goals of the retailer may take precedence.

SUMMARY

In one example, the present disclosure provides a device, method, and non-transitory computer-readable medium for identifying electronic purchase confirmation messages in a plurality of electronic messages for a user. For example, a processor may obtain an authorization to identify electronic purchase confirmation messages in a plurality of electronic messages for a user and to maintain a user purchase profile of the user. The processor may collect the plurality of electronic messages for the user, identifying the electronic purchase confirmation messages in the plurality of electronic messages, and determine a purchase category and a purchase amount from each of the electronic purchase confirmation messages that is identified. The processor may further obtain a verification of the purchase category that is determined from each of the electronic purchase confirmation messages that is identified, update the user purchase profile in accordance with the purchase category and the purchase amount from each of the electronic purchase confirmation messages that is identified, and perform an automated action in accordance with the user purchase profile that is updated.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, non-transitory (i.e., tangible or physical) computer-readable media, and methods for identifying electronic purchase confirmation messages in a plurality of electronic messages for a user. Examples of the present disclosure provide user-controlled purchase insights across merchants, and across products and purchase categories, by looking at electronic messaging (e.g., emails, Short Message Service (SMS) messages, and all types of electronic communications via which a user may receive a receipt or purchase confirmation). For example, a user may have a transaction with a merchant. The merchant may requests payment and the user may provide payment. The purchase and payment may be an online transaction, or may be at a point of sale, where the user provides an identity to the merchant and the merchant can thereby provide an electronic receipt/confirmation to the user via an electronic communication.

In one example, the merchant may processes the payment and send an electronic payment confirmation message to the user. In one example, the payment may be processed through a payment server or clearinghouse, e.g., a bank, a credit card company, etc. In one example, the electronic payment confirmation message may be sent through a messaging server for email, SMS, etc. In one example, a copy of the electronic payment confirmation message may also be sent to a messaging monitor, such as a telecommunication network operator or other entity, in order to identify sale/purchase transactions. In one example, the messaging monitor may forward identified sale/purchase transactions to an insight server for aggregation and for generating reports, predictions, visualizations, etc. In another example, the messaging monitor and insight server may be combined into a single device.

In one example, the present disclosure monitors communications to identify sale/purchase transactions using machine learning techniques, such as identifying purchase confirmation-related words, phrases, symbols, and/or monetary character sets, such as: "receipt", "confirmation", "purchase", "order", "invoice", "pro forma", "shipping", "tax", "delivery", "$", "returns", "warranty", etc., or by identifying the source of particular emails, such as specific payment processors, large and/or well-known merchants, specific email addresses, and so forth. In one example, machine learning techniques are used to both determine that a message is an electronic purchase confirmation message, and to categorize the purchase into one of a plurality of categories. For instance, one or more classifiers may be trained in accordance with a machine learning algorithm and then deployed to determine whether an electronic purchase confirmation message is or is not associated with a given purchase category. In one example, the plurality of purchase categories may be defined by the user.

The electronic purchase confirmation message may be from the merchant itself, or may be from a credit card company or other payment processor confirming the purchase transaction between the customer and the merchant. It should be noted that the examples of the present disclosure aggregate and analyze across multiple merchants and multiple payment systems. Thus, purchase confirmations may be contained in electronic communications from multiple credit card companies, multiple merchants/vendors, and so forth. The present disclosure is also user/consumer-centric and allows a user to gain insights into their own purchases across vendors/merchants, as opposed to individual vendors/merchants simply tracking customer purchases over time.

In one example, the customer may provide feedback to an insight server as to various inferences and conclusions reached by the insight server. For example, the user may indicate that various electronic purchase confirmation messages have been miscategorized, or the user may verify that various electronic purchase confirmation messages have been properly categorized, thereby improving the classifier accuracy.

In one example, the present disclosure categorizes transactions into one of a plurality of categories, keeps totals, and provides insight on the number of purchases and amounts spent in each category via a dashboard interface. In one example, the aggregation of the categorized transactions, total amounts spent, amounts spent with each merchant, and so forth may be stored as a user purchase profile. In addition, the present disclosure may provide for automated actions in response to a user's purchase profile. For example, a user may schedule an automated and/or recurring purchase based upon a detecting of a purchase of a same item, or a related item, such as scheduling a purchase of a new water filter in six months from a detected purchase. In one example, where the insight server is deployed by a telecommunication network, the automated action may be taken according to a rule defined by the network operator, rather than the user. For instance, if a user has purchased greater than a certain dollar amount of electronic devices within the last year, the telecommunication network operator may upgrade the bandwidth of a connection to the user's home, may deploy additional resources to an area associated with the user, such as additional media servers, CDN edge caches, and so forth. These and other aspects of the present disclosure are discussed in greater detail below in connection with the examples of FIGS. 1-5.

Figure 1:
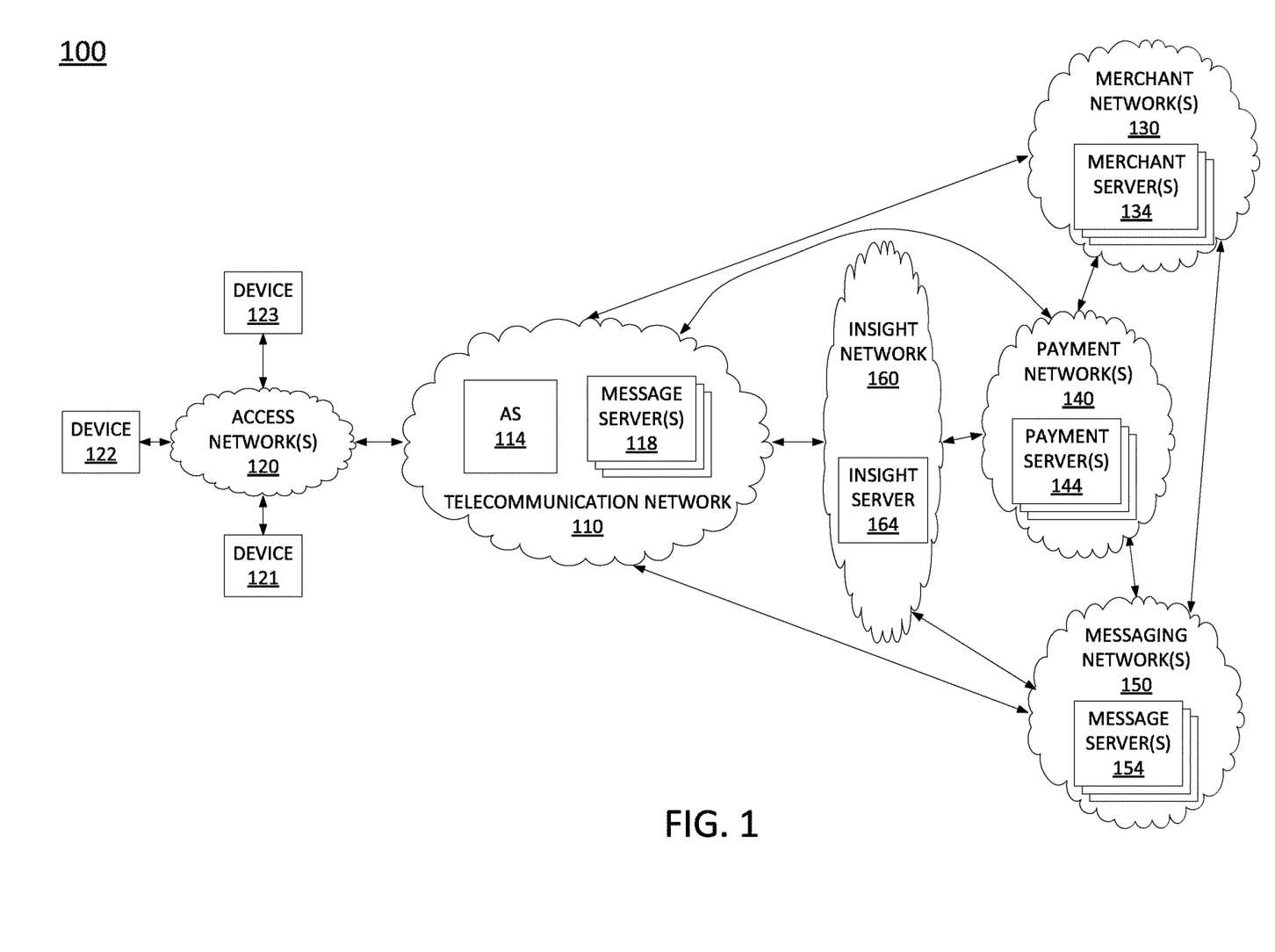
FIG. 1 illustrates one example of a system in which examples of the present disclosure for identifying electronic purchase confirmation messages in a plurality of electronic messages for a user may operate.

To aid in understanding the present disclosure, FIG. 1 illustrates an example system 100 comprising a plurality of different networks in which examples of the present disclosure for identifying electronic purchase confirmation messages in a plurality of electronic messages for a user may operate. As illustrated in FIG. 1, the system 100 includes a telecommunication network 110, which may comprise a core network with components for telephone services, Internet services, and/or television services (e.g., triple-play services, etc.) that are provided to customers (broadly "subscribers"), and to peer networks. In one example, telecommunication network 110 may combine core network components of a cellular network with components of a triple-play service network. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 110 may also further comprise a broadcast television network, e.g., a traditional cable provider network or an Internet Protocol Television (IPTV) network, as well as an Internet Service Provider (ISP) network. With respect to television service provider functions, telecommunication service provider network 110 may include one or more television servers for the delivery of television content, e.g., a broadcast server, a cable head-end, a video-on-demand (VoD) server, and so forth. For example, telecommunication network 110 may comprise a video super hub office, a video hub office and/or a service office/central office. In one example, telecommunication network 110 may also include an application server (AS) 114 and one or more message servers 118, as described in greater detail below. For ease of illustration, various components of telecommunication network 110 are omitted from FIG. 1.

In one example, each of access networks 120 may comprise a Digital Subscriber Line (DSL) network, a broadband cable access network, a Local Area Network (LAN), a cellular or wireless access network, and the like. For example, access networks 120 may transmit and receive communications between devices 121-123, e.g., endpoint devices, and between telecommunication network 110 and devices 121-123 relating to voice telephone calls, communications with web servers via the Internet, and so forth. Access networks 120 may also transmit and receive communications between devices 121-123 and other networks and devices, such as merchant networks 130, payment networks 140, messaging networks 150, insight network 160, and so forth, via telecommunication network 110 and/or the Internet in general. Devices 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like.

In one example, any of access networks 120 may be operated by a different entity from that which operates telecommunication network 110. For example, access networks 120 may include an Internet service provider (ISP) network, a cable access network, and so forth. In another example, any of access networks 120 may be operated by a same entity that operates telecommunication network 110. For instance, access networks 120 may include a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication network 110 may provide mobile core network functions, e.g., of a public land mobile network (PLMN)-universal mobile telecommunications system (UMTS)/General Packet Radio Service (GPRS) core network, or the like. In still another example, access networks 120 may include a home network, which may include a home gateway, which receives data associated with different types of media, e.g., television, phone, and Internet, and separates these communications for the appropriate devices. For example, data communications, e.g., Internet Protocol (IP) based communications may be sent to and received from a router in one of access networks 120, which receives data from and sends data to the devices 121-123, respectively.

In this regard, it should be noted that in some examples, devices 121-123 may connect to access networks 120 via one or more intermediate devices, such as a home gateway and router, e.g., where access networks 120 comprise broadband cable access networks, ISPs and the like, while in another example, devices 121-123 may connect directly to access networks 120, e.g., where access networks 120 may comprise local area networks (LANs) and/or home networks, and the like.

As illustrated in FIG. 1, the system 100 further includes merchant networks 130, payment networks 140, messaging networks 150 and insight network 160, which may represent corporate, governmental or educational institution LANs, and the like, or a distributed network connected through permanent virtual circuits (PVCs), virtual private networks (VPNs), and the like for providing data and voice communications for various entities. For example, in accordance with the present disclosure, each of merchant networks 130 may comprise a network with various computing devices supporting a merchant's business, including email servers, web servers hosting various publicly accessible webpages providing information on goods and services provided by a merchant, and providing various options for contacting the merchant via email, online chat, etc., and/or for online ordering of the goods and services advertised on the various webpages. In one example, each of merchant networks 130 may also include servers for various functions including: inventory maintenance, supply chain management, purchasing and ordering fulfillment, customer account maintenance, and the like, as well as personnel management, payroll, and so forth. As illustrated in FIG. 1, merchant servers 134 may represent any of the above-described devices. Merchant networks 130 may also include various user endpoint devices (not-shown) for customer facing personnel (e.g., customer service agents, retail store employees, etc.) and non-customer facing personnel of a merchant, such as buyers and purchasing agents, advertising and marketing personnel, warehouse personnel, fraud prevention personnel, management personnel, etc. For example, a merchant network 130 may also include point-of-sale terminals and/or checkout terminals for accepting payment at various retail locations, for example.

In one example, merchant servers 134 in merchant networks 130 may communicate with customer devices, such as devices 121-123, via access networks 120, telecommunication network 110 and/or the Internet in general, to complete online purchase transactions relating to goods and/or services provided by the respective merchants associated with merchant networks 130. For example, the users of device 121-123, and any other number of users may also comprise credit card holders of credit cards issued by a credit card issuer associated with one of payment networks 140 and/or account holders of a bank associated with one of payment networks 140, and may also comprise customers of the respective merchants associated with merchant networks 130. Customers associated with devices 121-123 may also engage in in-person purchase transactions by being physically present at a retail location of one of the merchants associated with merchant networks 130, for instance. In one example, the merchant servers 134 may record and store information regarding purchase transactions and/or may send the information regarding the purchase transactions to devices on other networks, as described in greater detail below. The information regarding the purchase transactions may include a time, a date, a purchase amount, and a customer identifier of the customer, such as an account number and/or a customer number of the customer with the merchant, a credit card account number of the customer, and so forth. It should be noted that some customers may pay in-person with cash or a similar non-personally identifiable form of payment. However, a purchase transaction may still be associated with a customer by asking the customer to provide a customer identifier at the time of the transaction, e.g., by a checkout cashier at a retail location of a merchant entering the customer identifier into a checkout terminal.

In one example, each of payment networks 140 may comprise a network with various computing devices of a credit card issuer, a bank, or other type of payment clearinghouse. Aspects of payment networks 140 may be similar to that which is described above in connection with example merchant networks 130, such as various user endpoint devices for personnel of payment networks 140, web servers for customers to login and access customer account information and/or to access other information regarding one of the payment networks 140, email servers for communicating with customers/account holders, for email hosting for personnel of the payment networks 140, and so forth. In one example, payment networks 140 may maintain payment servers 144 for authorizing payments for customer purchase transactions, maintaining accountings with various merchants, such as merchants associated with merchant networks 130, maintaining accountings for various customers, such as customers associated with endpoint devices 121-123, and so on. For instance, merchant servers 134 in merchant networks 130 may include servers supporting online and/or in-store purchases and may be authorized by a credit card issuer associated with one of payment networks 140 to accept credit card payments, may be authorized by a bank to accept checking account or debit card payments, and so forth. In particular, merchant servers 134 may communicate with payment servers 144 in payment networks 144 via telecommunication network 110 and/or the Internet in general to obtain credit card authorizations, bank authorizations, and the like, in any manner that is known within the industry. For instance, connections between telecommunication network 110, access networks 120, merchant networks 130, payment networks 140, messaging networks 150 and insight network 160 may comprise the Internet in general, internal links under the control of a single telecommunication service provider network, links between peer networks, and so forth.

In one example, in addition to authorizing various purchase transactions between customers and merchants associated with merchant networks 130, payment servers 144 may also record and store information regarding purchase transactions and/or may send the information regarding the purchase transactions to devices on other networks, as described in greater detail below. The information regarding the purchase transactions may include a time, a date, a purchase amount, a merchant identifier, a customer identifier of the customer, such as an account number and/or a customer number of the customer with the merchant, a credit card account number of the customer, a location of the purchase transaction, e.g., a retail location, or, for an online purchase transaction, a location of the user and/or the merchant, and so forth.

Messaging networks 150 may include messaging servers 154 for sending various types of electronic messages, including emails, short message service (SMS) messages, multimedia message service (MMS) messages, chat messages, such as via a messaging platform of an "over-the-top" messaging provider (broadly "instant message applications"), and the like. In one example, messaging servers 154 may send messages on behalf of merchants associated with merchant networks 130 and/or entities associated with payment networks 140 regarding purchase transactions of various users (e.g., customers of the merchants associated with merchant networks 130 and/or account holders with entities associated with payment networks 140). In particular, message servers 154 may send messages to various user/customer, such as users of devices 121-123, comprising electronic purchase confirmation messages. The electronic purchase confirmation messages may include electronic receipts, purchase orders, packing lists, credit card or banking alerts, tickets, vouchers, itineraries, and the like. The electronic purchase confirmation messages may be sent by message servers 154 on behalf of merchants associated with merchant networks 130 and/or entities, such as banks, credit card issuers, or other payment clearinghouses associated with payment networks 140. It should also be noted that in another example, merchant networks 130 and/or payment networks 140 may also include their own respective message servers for sending electronic purchase confirmation messages and other communications to user/customers, such as users associated with devices 121-123.

In one example, the electronic messages may be sent to devices 121-123 and/or to accounts associated with the users of devices 121-123 (e.g., email accounts) via access networks 120, telecommunication network 110 and/or the Internet in general. In one example, message servers 118 in telecommunication network 110 may receive, forward, and/or store messages on behalf of devices 121-123 and/or the users of devices 121-123. For instance, message servers 118 may include an email server which maintains an inbox and outbox for an email account for each of the users associated with devices 121-123, respectively. Message servers 118 may also include an SMS server which may store SMS messages for devices 121-123 until such devices are connected to and/or reachable by telecommunication network 110, and which may deliver SMS messages when an intended recipient device of devices 121-123 is available. In this regard, message servers 118 may also forward copies of electronic messages processed by the message servers 118 to application server (AS) 114 and/or insight server 164. In one example, the electronic messages may be provided to AS 114 and/or insight server 164 for processing in accordance with authorizations from the users of devices 121-123 respectively. In a different example, AS 114 may be configured to provide one or more operations or functions for identifying electronic purchase confirmation messages in a plurality of electronic messages for a user, in accordance with the present disclosure.

Figure 4:
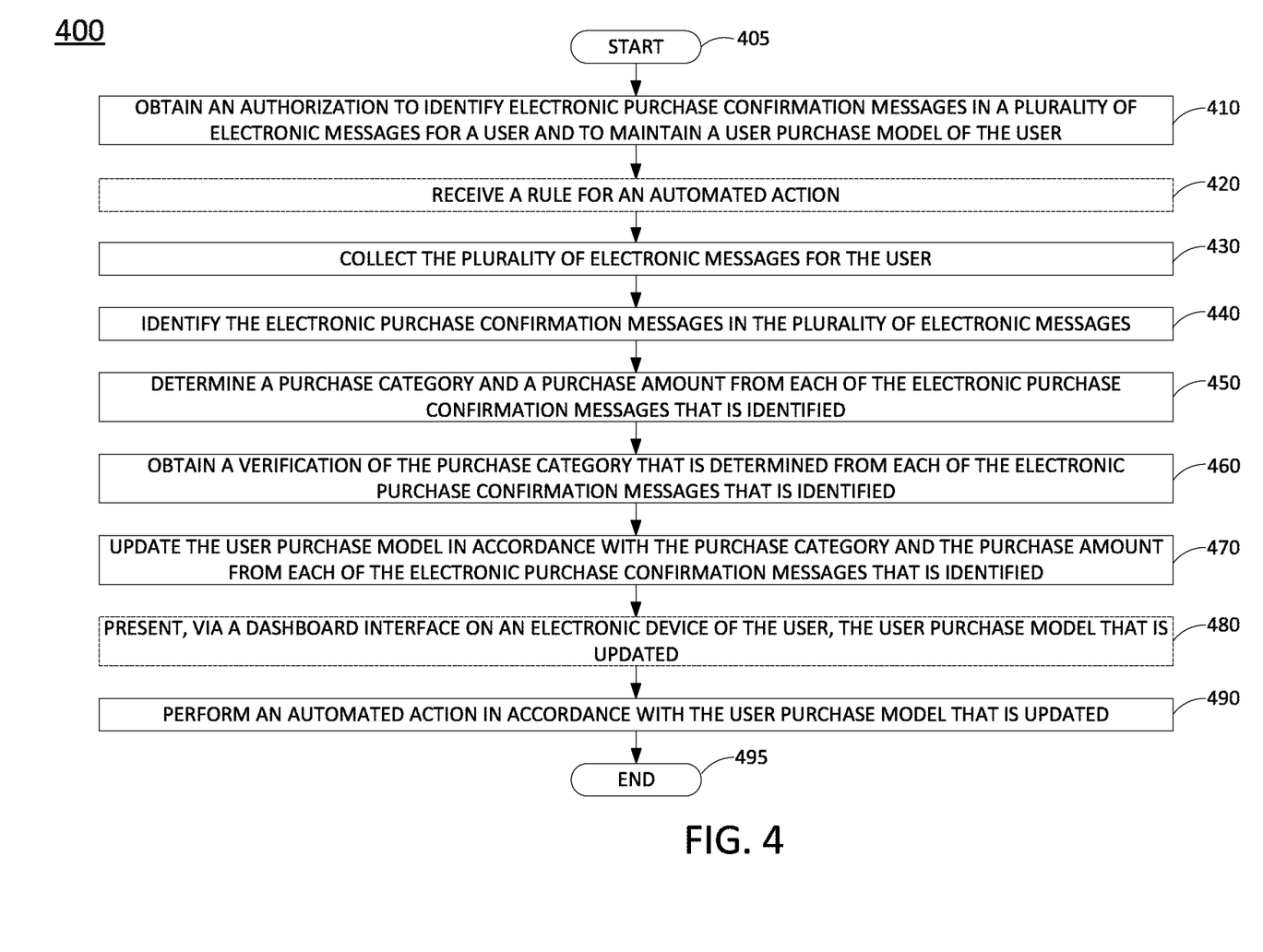
FIG. 4 illustrates an example flowchart of a method for identifying electronic purchase confirmation messages in a plurality of electronic messages for a user.

In one example, the system 100 includes insight network 160 with an insight server 164. In one example, insight server 164 may comprise a computing system or server, such as computing system 500 depicted in FIG. 5, and may be configured to provide one or more operations or functions for identifying electronic purchase confirmation messages in a plurality of electronic messages for a user. Similarly, in a different example, AS 114 may be configured to provide one or more operations or functions for identifying electronic purchase confirmation messages in a plurality of electronic messages for a user, in accordance with the present disclosure. It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. A flowchart of an example method of identifying electronic purchase confirmation messages in a plurality of electronic messages for a user is illustrated in FIG. 4 and described in greater detail below.

To illustrate, in one example, AS 114 and/or insight server 164 may accumulate electronic messages for users associated with devices 121-123 from message servers 118 and/or from message servers 154. Alternatively, or in addition, AS 114 and/or insight server 164 may accumulate electronic messages from merchant servers 134 and/or payment servers 144. For example, merchant networks 130 and/or payment networks 140 may include messaging servers which may perform the same or similar functions as message servers 154, including the sending of electronic purchase confirmation messages. In one example, the respective users of devices 121-123 may authorize merchants associated with merchant networks 130 and/or entities associated with payment networks 140 to share purchase confirmation messages with AS 114 and/or insight server 164. Thus, the messages may be intercepted by AS 114 and/or insight server 164, or copied to such devices per authorizations from the users associated with devices 121-123, respectively.

Regardless of the manner in which the electronic messages are obtained, AS 114 and/or insight server 164 may then: identify electronic purchase confirmation messages in the electronic messages, determine purchase categories and purchase amounts from each of the electronic purchase confirmation messages, obtain verifications of the purchase categories that are determined, update user purchase profiles in accordance with the purchase categories and the purchase amounts, perform automated actions in accordance with user purchase profiles that are updated, and so forth. In this regard, in one example, AS 114 and/or insight server 164 may communicate with devices 121-123 via access networks 120, telecommunication network 110 and/or the Internet in general to obtain user authorizations, to obtain verifications of purchase categories that are determined for electronic purchase confirmation messages in the electronic messages for the respective users, and so forth.

Further details regarding the functions that may be implemented by AS 114 and/or insight server 164, merchant servers 134, payment servers 144, message servers 154, and so forth are discussed in greater detail below in connection with the examples of FIGS. 2-5. In addition, those skilled in the art will realize that the system 100 may be implemented in a different form than that which is illustrated in FIG. 1, or may be expanded by including additional endpoint devices, access networks, network elements, application servers, etc. without altering the scope of the present disclosure. Thus, these and other modifications are all contemplated within the scope of the present disclosure.

Figure 2:
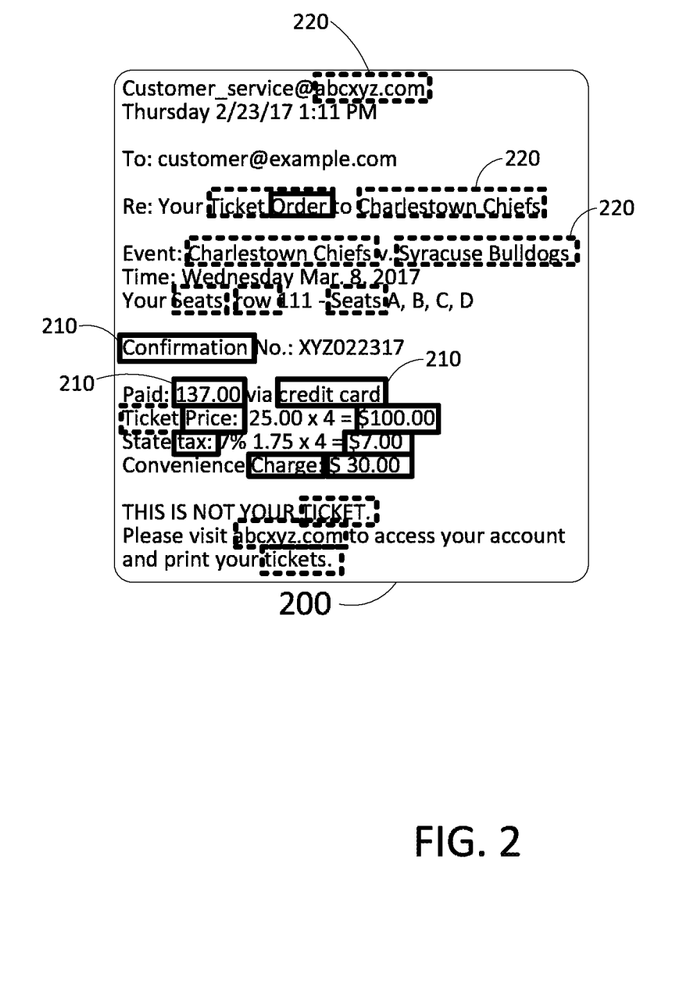
FIG. 2 illustrates an example of an electronic message that may be recognized as an electronic purchase confirmation message and from which a purchase category and a purchase amount can be determined, in accordance with the present disclosure.

To further aid in understanding the present disclosure, FIG. 2 illustrates an example of an electronic message 200 that may be recognized as an electronic purchase confirmation message and from which a purchase category and a purchase amount can be determined. As illustrated in FIG. 2, the electronic message 200 may comprise an email. However, it should be understood that various electronic messages that may be processed in accordance with examples of the present disclosure may take different forms that generally include readable text, such as SMS messages, instant messages, etc. In one example, a device, e.g., a server, such as AS 114 or insight server 164 in FIG. 1, may process the electronic message 200 in order to determine that it is, in fact, an electronic purchase confirmation message rather than a message with some other type of content. In one example, the electronic message 200 may be processed to identify purchase confirmation-related words, phrases, symbols, or monetary character sets. For instance, as can be seen in FIG. 2, various words, phrases and symbols that are purchase confirmation-related are indicated by the solid lined boxes 210 (for ease of illustration, not all of the solid lined boxes 210 are specifically labeled). For instance, the solid lined boxes 210 include the words or phrases: "order", "confirmation", "price", "credit card", "tax", and "charge". In addition, the solid lined boxes 210 include the monetary character sets "137.00", "$100.00", "$7.00" and "$30.00". Several of these monetary character sets also include the dollar sign/symbol "$".

In one example, the purchase confirmation-related words, phrases, symbols, or monetary character sets may be identified using a pre-defined set of purchase confirmation-related words, phrases, symbols and/or monetary character templates which may include at least the items indicated in the solid lined boxes 210, or at least a template of these items. Examples of a template may include: a dollar sign followed by an number of numeric characters, e.g., "$ _ _ _ _", a dollar sign followed by any number of numeric characters followed by a decimal point followed by two numerical character, e.g., "$ _ _ _._ _", or a similar template without a dollar sign, e.g., "_ _ _._ _", for instance. The pre-defined set of purchase confirmation-related words, phrases, symbols and monetary character templates may also include other words and phrases that are purchase confirmation-related, such as "invoice", "pro-form", "shipping & handling", "COD", "purchase", "sale", "discount", etc. It should be noted that purchase confirmation-related words, phrases, and symbols may also include words and phrases that may be considered as shipping or delivery-related, and may include abbreviations, such as "COD" for "charge on delivery", "FOB" for "free on board", and so forth.

In one example, the electronic message 200 may be determined to be an electronic purchase confirmation message when a certain threshold is reached, such as a threshold number of purchase confirmation-related words, phrases, symbols, or monetary character sets, a threshold percentage of purchase confirmation-related words, phrases, symbols, or monetary character sets with respect to a total number of characters or words of the message, and so forth. It should be noted that the parsing of characters to identify the purchase confirmation-related words, phrases, symbols and/or monetary character sets may include optical-character recognition to identify characters in an electronic image. However, messages such as email or SMS messages may include text in an American Standard Code for Information Interchange (ASCII) format, or other type of standard format from which the characters comprising the message, and the order of the characters may be identified.

In the example of FIG. 2, the electronic message 200 may include ten purchase confirmation-related words, phrases, symbols, or monetary character sets from a total of 405 non-whitespace characters, or 78 words. Accordingly, in one example, the threshold may be set to 0.014 and the electronic message 200 may be identified as an electronic purchase confirmation message where the ratio (rounded) of the number of purchase confirmation-related words, phrases, symbols and monetary character sets to characters is 10÷405=0.0247. In another example, the threshold may be set to 0.067 and the electronic message 200 may be identified as an electronic purchase confirmation message where the ratio (rounded) of the number of purchase confirmation-related words, phrases, symbols and monetary character sets to words is 10÷78=0.1282. The foregoing are just two examples of the ratios and thresholds that may be used in accordance with the present disclosure. For instance, in another example, different categories of purchase confirmation-related words, phrases, symbols and monetary character sets may be given different weightings in determining whether a threshold is exceeded for determining that an electronic message is an electronic purchase confirmation message. For instance, monetary character sets may be more heavily weighted, certain words such as "invoice" and "tax" may be more heavily weighted than other words such "sale" which may be just as likely to be indicative of an advertisement as a purchase confirmation. Thus, these and other variations are all contemplated within the scope of the present disclosure.

In one example, a pre-defined set of purchase confirmation-related words, phrases, symbols and/or monetary character templates may be defined by a telecommunication network operator or other entity providing a device for identifying electronic purchase confirmation messages in a plurality of electronic messages for a user, such as an operator of telecommunication network 110 or insight network 160 of FIG. 1. Similarly, a threshold for determining whether an electronic message comprises an electronic purchase confirmation message may be set by the same or another entity. Alternatively, or in addition, a user may create and/or edit a pre-defined set of purchase confirmation-related words, phrases, symbols and/or monetary character templates that is personalized to the user. For instance, the user may make a large number of purchases from a particular merchant that uses a form electronic purchase confirmation message that may include a stock word, phrase or abbreviation that the user believes would help identify electronic purchase confirmation messages from this particular merchant. In another example, the user may be aware that he or she only receives electronic messages that are purchase confirmation messages from a particular merchant. Thus, the name of the merchant, or the merchant's email address from which the messages originate may be added by the user to the pre-defined set of purchase confirmation-related words, phrases, symbols and/or monetary character templates. In still another example, the determining of an electronic message, such as electronic message 200, as being an electronic purchase confirmation message may comprise applying and updating a machine learning algorithm, such as a binary classifier, that determines whether or not the electronic message is an electronic purchase confirmation message. The machine learning algorithm may be updated based upon verifications from a user as to whether certain electronic messages are properly categorized by the machine learning algorithm as either being an electronic purchase confirmation message or not.

In addition to determining that electronic message 200 is an electronic purchase confirmation message, a purchase amount and a category of the purchase may also be determined. In one example, the purchase amount may be identified based upon recognizing monetary character sets, as described above, and then selecting the highest dollar amount within the monetary character sets that are found. In another example, the purchase amount may be determined by selecting the dollar amount from a monetary character set that follows certain keywords or phrases, such as "total purchase amount:" for example.

As illustrated in FIG. 2, the dashed line boxes 220 illustrate various words, phrases and/or abbreviations that may comprise "features" that are useable to categorize the electronic message 200 as being related to one of a plurality of purchase categories. For instance, the words and phrases "ticket order", "seats", "row", "ticket price", "ticket", etc., may be indicative that electronic message 200 is an electronic purchase confirmation message for a purchase of a ticket, which may be strongly correlated with "entertainment" (e.g., tickets to sporting events, concerts, etc.) and/or "vacation" (e.g., airline tickets) categories. However, the words and/or phrases "Charlestown Chiefs" and "Syracuse Bulldogs" may be well known sports teams which are associated with the "entertainment" category, but not with a "vacation" category. In addition, the set of characters "abcxyz.com" may be a domain of a sporting event ticket reseller and may therefore be determined to comprise a feature that is associated with the "entertainment" category, whereas a domain of an airline may be associated with a "vacation" or "travel" category.

In one example, a machine learning algorithm may be used to generate a classifier, such as a support vector machine (SVM), e.g., a binary classifier and/or a linear binary classifier, a multi-class classifier, a kernel-based SVM, etc., a distance-based classifier, e.g., a Euclidean distance-based classifier, or the like, that may be used to determine a category of a purchase indicated in an electronic purchase confirmation message, such as electronic message 200. In one example, the machine learning algorithm may be used to generate a series of classifiers, e.g., one for each of a plurality of possible purchase categories that may be defined by a user.

In one example, the machine learning algorithm may involve generating and/or training a classifier (or multiple classifiers) using a training data set. In one example, with respect to each category the training data set may comprise positives examples of electronic purchase confirmation messages that may be indicated by a user as being associated with a particular category. In one example, the training data set may also include negative examples of electronic purchase confirmation messages that may be indicated by a user as being not associated with a particular category (or which may be inferred to not be associated with a particular category based upon an indication from the user that the electronic purchase confirmation message is associated with a different category). In addition, in one example, the training data set may include electronic purchase confirmation messages and indications of categories of such messages for a plurality of users. For example, a number of users may have the same or similar categories of "entertainment". Thus, data from multiple users may be used to train a classifier in accordance with the present disclosure. However, in one example, classifiers are trained and deployed in a manner personalized to each user. Thus, for example, training data from other users may be used to train a classifier that will be used to categorize electronic purchase confirmation messages for a given user. However, the given user's own training data may be given a preference, a greater weighting, etc.

In an example where the classifier comprises a support vector machine (SVM), the machine learning algorithm may calculate a hyper-plane in a hyper-dimensional space representing the feature space of all possible data points that may be used to identify categories of electronic purchase confirmation messages. The "features" may comprise whether particular words, phrases, abbreviations, and so forth appear in an electronic purchase confirmation message, a number of appearance of such words, a percentage of words deemed related to a category versus a total number of words in an electronic purchase conformation message, and so on. In one example, to supplement the training data set, a dictionary of words and phrases related to a particular category may be provided by a user or by an entity offering a device for identifying electronic purchase confirmation messages in a plurality of electronic messages for a user, in accordance with the present disclosure. However, in another example, the machine learning algorithm may determine features, including words and phrases that may be related to or associated with a category, in an unsupervised manner. The hyper-plane may define a boundary in the feature space which separates positive examples from negative examples. However, it should be noted that the present disclosure is not limited to binary data points in the training data set. For instance, in a multi-class classifier, a data point may comprise a range of a plurality of possible ranges of a particular feature, e.g., a number of instances of the word "ticket" may comprise a feature that can take one of 4 possible values: { [0], [1-3], [4-5], [5+] }. In addition, in a distance-based classifier, values for a data point may range from zero to a maximum value, for example.

Once a classifier is generated for a particular category or for a plurality of categories, the classifier may be applied to classify additional electronic messages, such as electronic message 200. For instance, the classifier may classify the electronic purchase confirmation message into one of two categories: within the purchase category, or not within the purchase category. For instance, various features of the electronic purchase conformation message may be quantified and applied to the classifier. For example, a vector in the feature space may represent the various features of the electronic purchase confirmation message, and the classifier may be used to determine on which "side" of the hyper-plane the vector lies. As such, the classifier may determine whether the electronic purchase confirmation message is likely to be related to the purchase category, or not, based upon the result of the classification.

In one example, a confidence score may be calculated and provided along with the classification. For instance, a distance between the vector representing the customer and the hyperplane may be calculated. Thereafter, the confidence score may be calculated from the distance. For example, the confidence score may be proportional to the distance. The greater the distance, the higher the confidence score. In one example, the relationship between the distance and the confidence score may be empirically set. Thus, for example, if a series of binary classifiers is used (e.g., one for each possible category), an electronic purchase confirmation message may be determined to be associated with a category having the highest confidence score.

It should be noted that variations of the above described process may be implemented in accordance with the present disclosure. For example, if there are comparatively few positive examples or few negative examples, e.g., less than 20 percent, less than 15 percent, etc., a greater or lesser percentage of positive examples or negative examples may be utilized from the training data set as inputs to the machine learning algorithm to effect a positive example weighting or negative example weighting. In another example, the feature space may comprise a reduced feature space that may be determined by first performing feature selection over a number of features. For example, a feature selection process may include reducing the number relevant features to those which are most useful in a classifier to segregate electronic purchase confirmation messages associated with a category from those which are not. Thus, for example, a "feature," with a higher number of positive examples may be selected for inclusion in a reduced "feature set" over a feature with fewer or no positive examples, where the feature set may include features comprising dimensions within the reduced feature space. For instance, the words, phrases and/or abbreviations "motor vehicle", "department of motor vehicle" and "DMV" may be strongly associated with the "automotive" category. However, it should be noted that a feature that is strongly associated with negative examples may also be included in the reduced feature set. For instance, electronic purchase confirmation messages in the training data set may include the abbreviation "DMV", but none may be indicated to be associated with the "gift" category. Thus, this term/abbreviation may comprise a strong (negative) feature for the binary decision making of a classifier for the "gift" category, and may also be selected for inclusion.

Alternatively, or in addition, a principal component analysis (PCA) may be applied to the training data set. For instance, PCA may be applied to a hyper-dimensional space of all of the possible features that may be included in the feature set. In another example, PCA may be applied to a hyper-dimensional space based upon a reduced feature set (e.g., a "reduced feature space"). In one example, a hyperplane in the hyper-dimensional space (e.g., with or without PCA transformation) may be generated to represent an average of the values for various customer traits for all of the positive examples. In one example, a portion of the training data set may be set aside for use as a testing data set may be used to verify the accuracy of the classifier.

It should also be noted that in other, further, and different examples, variations of one or more of the above described operations may be implemented in accordance with the present disclosure. For example, a decision tree algorithm may be used instead of a SVM-based binary classifier. In another example, a binary k-nearest neighbor algorithm may be utilized. In still another example, a distance-based classifier may be used. For example, the machine learning algorithm may comprise a clustering algorithm over positive examples to generate a vector in a hyper-dimensional space representing the average of the positive examples. In other words, the vector may represent the "average" of the features of positive example electronic purchase confirmation messages. Classification of an additional electronic purchase confirmation message may then comprise generating a vector representing the features of the additional electronic purchase confirmation message, and calculating a Euclidean distance or cosine distance/similarity from the vector representing the "average" of the positive example electronic purchase confirmation messages. Thus, these and other modifications are all contemplated within the scope of the present disclosure.

Figure 3:
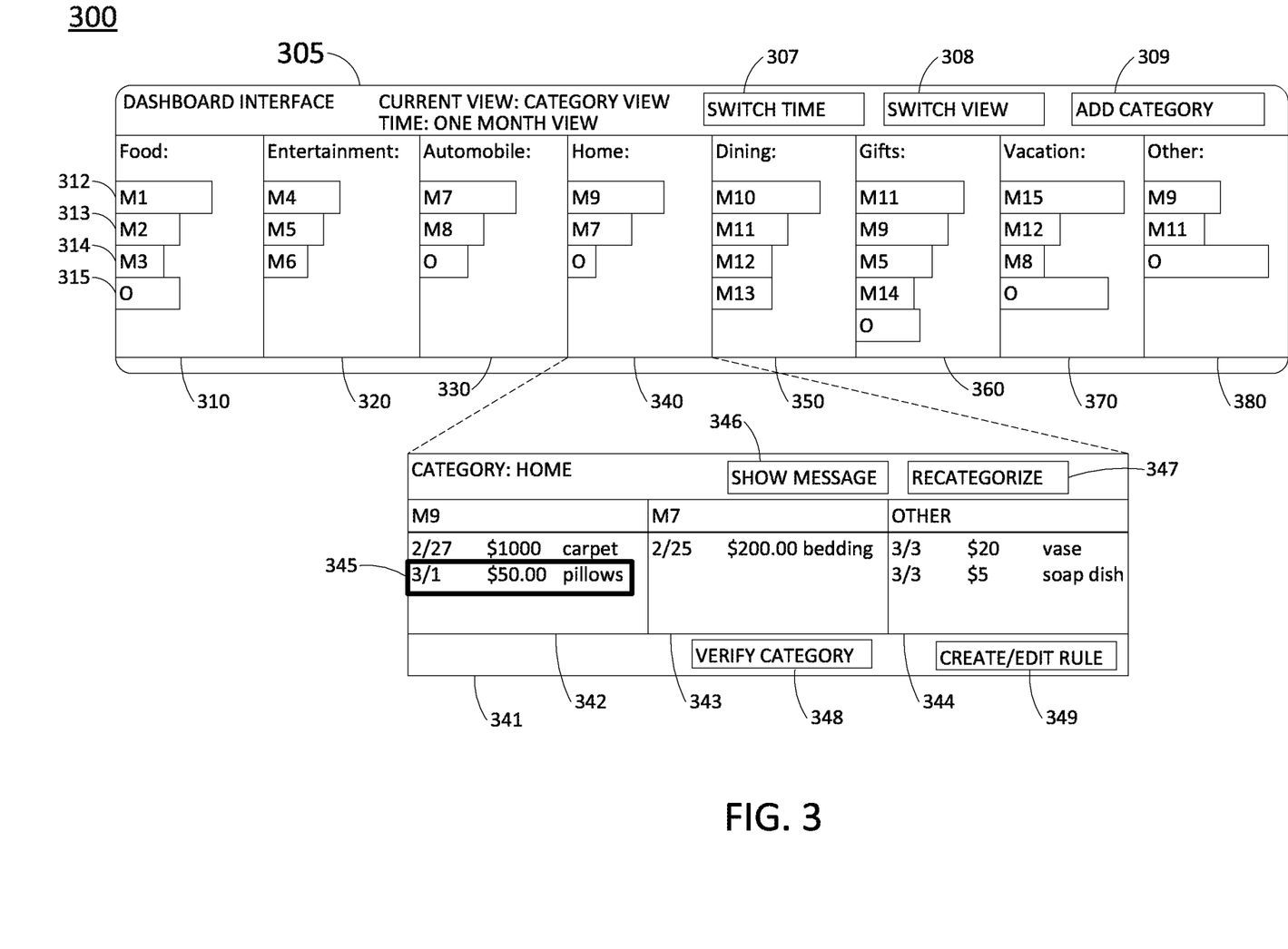
FIG. 3 illustrates an example dashboard interface in accordance with the present disclosure.

To further aid in understanding the present disclosure, FIG. 3 illustrates an example dashboard interface 300 associated with examples of the present disclosure for identifying electronic purchase confirmation messages in a plurality of electronic messages for a user. In one example, the dashboard interface 300 may be presented as a graphical user interface via a display screen of a user endpoint device, and may be manipulated and interacted with via various types of input devices, such as a keyboard and/or a mouse, or via voice commands, gestures via a touchscreen, inputs via a soft keyboard, and so forth. As illustrated in FIG. 3, dashboard interface 300 may include a first window comprising a category view 305. In one example, category view 305 may present a number of categories, such as "food", "entertainment", "automobile", "home", "dining", "gifts", "vacation", and "other", in columns 310, 320, 330, 340, 350, 360, 370 and 380 respectively. As described above, the categories may be defined by a user. In addition, a user may deploy new categories in addition to those already in use, e.g., via selecting the "add category" button 309 in the category view 305 of the dashboard interface 300.

In one example, each of the columns 310, 320, 330, 340, 350, 360, 370 and 380 may include bars representing a level or dollar amount of purchases from different merchants within a respective category and for the relevant time period. In the present example, the time period may be one month, as indicated in the information contained in the dashboard interface 305: "TIME: ONE MONTH VIEW". To illustrate, column 310 for the category "food" includes bars 312-315, representing a level of purchases relating to a merchant M1, a merchant M2, a merchant M3, and all other merchants (O). In one example, merchants for which less than a threshold dollar amount of purchases/spending was incurred by a user during the relevant time period may all be lumped into the "other" grouping. For ease of illustration, the bars in the other columns are not labeled. However, it should be understood that these bars may be similar to the bars 312-315 in column 310 for the "food" category.

In one example, the dashboard interface 300 may also offer a plurality of different views, including the category view 305. For instance, the window/view may be changed via the "switch view" button 308. A different view may comprise, for example, a view where columns group purchases by merchants (e.g., a top eight merchants by dollar amount spent), where bars may be presented within each column representing spending levels and/or dollar amounts with respect to different purchase categories. In this regard, it should be noted that the organization of visual information in the example dashboard interface 300 and example category view 305 may take a different form in other, further, and additional examples of the present disclosure, e.g., rows for each category instead of columns 310, 320, 330, 340, 350, 360, 370 and 380, lines instead of bars, pie graphs for the spending levels within each category with respect to different merchants, and so forth. In one example, the time period for which information is displayed in the category view 305 may be changed via "switch time" button 307. For example, the relevant time period may be changed from one month to three months, six months, one year, etc.

In one example, the dashboard interface 300 provides additional windows with more detailed information regarding a category. For example, the window 341 may be displayed if a user clicks on or otherwise selects the column 340 from the category view 305. The window 341 may supplant the display of the category view 305 within a display screen, or may be fully or partially overlaid on the category view 305 within the display screen, for example. As illustrated in the example of FIG. 3, the window 341 presents more detailed information regarding the purchases in the "home" category for merchant M9, for merchant M7 and for "other" merchants in columns 342, 343, and 344, respectively, such a date of a purchase, an amount spent, and a brief description of the item or service.

In one example, a user may select an entry and then select various options. For example, a user may have highlighted the entry 345 for a $50.00 purchase of pillows on March 1 from merchant M9. A selection of the "show message" button 346 may cause another window (not shown) to be displayed with the underlying electronic purchase confirmation message from which the entry was derived. The electronic purchase confirmation message may be similar to the electronic message 200 illustrated in FIG. 2, for instance. A selection of the "recategorize" button 347 may provide a list from which a user may select a different category, e.g., "food", "entertainment", "automobile", "dining", "gifts", "vacation", or "other" to which the purchase associated with entry 345 should be assigned instead. For instance, in the opinion of the user, a classifier may have improperly classified the electronic purchase confirmation message associated with entry 345 as being of the "home" category. For instance, the user may have purchased pillows as a gift for a friend, and would prefer the purchase to be associated with the "gift" category instead of the "home" category.

On the other hand, a user may also verify that a purchase (and the underlying electronic purchase confirmation message) is properly categorized via the "verify category" button 348. In one example, electronic purchase confirmation messages that are "verified" may be used to update the classifier(s) that may be used to categorize future electronic purchase confirmation messages. As further illustrated in the example of FIG. 3, the window 341 may further include a "create/edit rule" button 349. For instance, the "create/edit rule" button 349 may cause an additional window (not shown) to be displayed in which a user may define a rule for an automated action to be taken based upon various triggers relating to the purchase category of window 341, e.g., "home" related purchases. For instance, a user may define a rule that when a water filter is purchased, an automatic purchase of another water filter of the same type should be scheduled for three months time, six months time, etc. The user may indicate a specific merchant with which to schedule the automated purchase, or may define a group of approved merchants from which the automated purchase may be made. For example, the user may leave it to the user's endpoint device or a server to select the most cost effective merchant from which to purchase the particular model of water filter.

FIG. 4 illustrates an example flowchart of a method 400 for identifying electronic purchase confirmation messages in a plurality of electronic messages for a user. In one example, the steps, operations, or functions of the method 400 may be performed by any one or more of the components of the system 100 depicted in FIG. 1. For instance, in one example, the method 400 is performed by the application server (AS) 114 or insight server 164, or by AS 114 or insight server 164 in conjunction with other components of the system 100. Alternatively, or in addition, one or more steps, operations or functions of the method 400 may be implemented by a computing device having a processor, a memory and input/output devices as illustrated below in FIG. 5, specifically programmed to perform the steps, functions and/or operations of the method. Although any one of the elements in system 100 may be configured to perform various steps, operations or functions of the method 400, the method will now be described in terms of an example where steps or operations of the method are performed by a processor, such as processor 502 in FIG. 5.

The method 400 begins at step 405 and proceeds to step 410. At step 410, the processor obtains an authorization to identify electronic purchase confirmation messages in a plurality of electronic messages for a user and to maintain a user purchase profile of the user. The authorization may be obtained from the user, or may be obtained from an account holder of an account associated with the user, such as a parent providing an authorization with respect to a child or other family member. For instance, in one example, the processor may be deployed in a telecommunication network and may perform the method 400 for subscribers of the telecommunication network service provider and/or subscribers' household members. In another example, the processor may be deployed by another entity and may perform the method 400 for subscribers of a service for identifying electronic purchase confirmation messages in a plurality of electronic messages for a user, in accordance with the present disclosure. In one example, the user or an account holder may also define purchase categories into which electronic purchase confirmation messages are to be categorized by the processor. Following step 410, the method 400 may proceed to step 430 or to optional step 420.

At optional step 420, the processor may receive a rule for an automated action. In one example, the rule may be entered by the user or by an account holder associated with the user via a dashboard interface such as illustrated in FIG. 3. The rule may be a rule for an automated action to be performed in accordance with the user purchase profile, as described in greater detail in connection with step 490.

At step 430, the processor collects the plurality of electronic messages for the user. The plurality of electronic messages may be collected from one or more message servers of a telecommunication network, e.g., an email server, an SMS server, etc., or from message servers of one or more other providers, such as an email provider, an SMS provider, an over-the-top messaging provider, and so forth. In still another example, the plurality of electronic messages for the user may be obtained from a device of the user. For instance, the device of the user may forward the electronic messages to the processor after the electronic messages were first downloaded by the device of the user. However, in still another example, the processor may be a processor of the device of the user. The plurality of electronic messages may take various forms such as: emails, SMS messages, MMS messages, messages in a format utilized by an over-the-top messaging application, and so forth.

At step 440, the processor identifies the electronic purchase confirmation messages in the plurality of electronic messages. In one example, step 440 may include processing the plurality of electronic messages to identify purchase confirmation-related words, phrases, symbols, or monetary character sets, e.g., as described above in connection with the example of FIG. 2. For instance, in one example, an electronic message may be determined to be an electronic purchase confirmation message when a certain threshold is reached, such as a threshold number of purchase confirmation-related words, phrases, symbols, or monetary character sets, a threshold percentage of purchase confirmation-related words, phrases, symbols, or monetary character sets with respect to a total number of characters or words of the message, and so forth.

At step 450, the processor determines a purchase category and a purchase amount from each of the electronic purchase confirmation messages that is identified. In one example, the purchase amount may be identified based upon recognizing monetary character sets, as described above, and then selecting the highest dollar amount within the number of monetary character sets that is found. In another example, the purchase amount may be determined by selecting the dollar amount from a monetary character set that follows certain keywords or phrases, such as "total purchase amount:" for example.

In addition, as described above in connection with the example of FIG. 2, in one example, a machine learning algorithm may be used to generate a classifier, such as a support vector machine (SVM), e.g., a binary classifier and/or a linear binary classifier, a multi-class classifier, a kernel-based SVM, etc., a distance-based classifier, e.g., a Euclidean distance-based classifier, or the like, that may be used to determine a category of a purchase indicated in an electronic purchase confirmation message. In one example, the machine learning algorithm may be used to generate a series of classifiers, e.g., one for each of a plurality of possible purchase categories that may be defined by a user. In one example, various words, phrases and/or abbreviations, or combinations of characters, such as a domain name, may comprise "features" that are useable to categorize an electronic purchase confirmation message as being related to one of a plurality of purchase categories. For instance, the words and phrases "ticket order", "seats", "row", "ticket price", "ticket", etc., may be indicative that an electronic purchase confirmation message is for a purchase of a ticket, which may be strongly correlated with "entertainment" (e.g., tickets to sporting events, concerts, etc.) and/or "vacation" (e.g., airline tickets) categories.

Accordingly, in one example, step 450 may include the processor applying a classifier, or classifiers, to the features of each of the electronic purchase confirmation message to determine whether the electronic purchase confirmation message is or is not associated with each of a plurality of categories. In an example where multiple classifiers are applied, the category that is determined for a given electronic purchase confirmation message may be a category for which a classifier associated with the category produced a highest confidence score.

At step 460, the processor obtains a verification of the purchase category that is determined from each of the electronic purchase confirmation messages that is identified. In one example, the verification may be used to update the classifier(s) that may be used to categorize additional electronic purchase confirmation messages. In one example, the verification may be provided by the user or by an account holder via a dashboard interface, such as described above in connection with the example of FIG. 3. For instance, a parent may verify the categorizations of electronic purchase confirmation messages for a child or other household member.

At step 470, the processor updates the user purchase profile in accordance with the purchase category and the purchase amount from each of the electronic purchase confirmation messages that is identified. For instance, the user purchase profile may track purchases in different categories, from different merchants, and/or for different products over various time periods. Following step 470, the method 400 may proceed to step 490 or to optional step 480.

At optional step 480, the processor may present, via a dashboard interface on an electronic device of the user, the user purchase profile that is updated. For instance, various visualizations of the user purchase profile may be provided via a dashboard interface, such as described above and illustrated in the example of FIG. 3.

At step 490, the processor performs an automated action in accordance with the user purchase profile that is updated. In one example, the user or an account holder may define a rule for the automated action at optional step 420, which may then be implemented by the processor at step 490. For example, the automated action may comprise automatically ordering an item from a merchant for the user based upon the user purchase profile, and in accordance with a rule that may be provided at optional step 420. For instance, the user may create a rule that when a water filter is purchased, an automatic purchase of another water filter of the same type should be scheduled for 3 months time, 6 months time, etc. The user may indicate a specific merchant with which to schedule the automated purchase, or may define a group of approved merchants from which the automated purchase may be made. In another example, the rule may be to restrict access by an electronic device of the user to a merchant website, based upon the user purchase profile. For instance, a parent may set such a rule for a child so that the child is hindered from spending more than a certain amount, or making more than a certain number of purchases from a particular merchant, spending more than a certain amount, or making more than a certain number of purchases in a particular purchase category, and so forth, within a given time period. In another example, the rule may restrict a usage of an account (e.g., a credit card account, credits of a video game account, a bank account, etc.) by the user based upon the user purchase profile. The rule may be set by the user for himself/herself, or by an account holder with respect to the activities of the user.

Alternatively, or in addition, the automated action may be taken according to a rule defined by a telecommunication network operator, rather than the user. For example, the automated action may comprise allocating a network resource of the telecommunication network based upon the user purchase profile, or disabling a network resource of the telecommunication network based upon the user purchase profile. For instance, if a user has purchased greater than a certain dollar amount of electronic devices within the last year, the telecommunication network operator may upgrade the bandwidth of a connection to the user's home, may deploy additional resources to an area associated with the user such as additional media servers, CDN edge caches, etc., may activate a marketing automation platform to direct automated communications to device(s) of the user, and so forth. However, in another example, the automated action may comprise disabling a network resource of a telecommunication service provider network based upon the user purchase profile. For instance, if a user has not recently purchased more than a certain amount (e.g., in an "electronics" category), it may be assumed that the household is not interested in cutting-edge technology and are not heavy data users. Thus, the automated action may comprise disabling a network resource of a telecommunication service provider network based upon the user purchase profile. For instance, a picocell, a femtocell, a remote radio head (RRH) or baseband unit (BBU), network function virtualization infrastructure (NFVI), or the like that is activated and assigned to a coverage area of the user's home or where the user otherwise may spend a significant amount of time may be deallocated, deactivated, and/or reassigned based upon an anticipation that the user will not contribute a significant load to the telecommunication network.

Following step 490, the method 400 proceeds to step 495 where the method ends. It should be noted that the method 400 may be expanded to include additional steps or may be modified to include additional operations with respect to the steps outlined above. For example, the method 400 may be expanded to maintain a purchase model across multiple household members. In such an example, the processor may obtain electronic messages for all of the household members that are associated with the purchase model, determine electronic purchase confirmation messages in the electronic messages for the different household members, and so forth.

In addition, although not specifically specified, one or more steps, functions or operations of the method 400 may include a storing, displaying and/or outputting step as required for a particular application. In other words, any data, records, fields, and/or intermediate results discussed in the method 400 can be stored, displayed and/or outputted either on the device executing the method 400, or to another device, as required for a particular application. Furthermore, steps, blocks, functions, or operations in FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 400 may comprise optional steps, or can be combined, separated, and/or performed in a different order from that described above, without departing from the examples of the present disclosure.

As such, the present disclosure provides at least one advancement in the technical fields of telecommunication service provider network operations and online electronic user purchase profiling. In particular, examples of the present disclosure automatically: determine which electronic messages of a user are electronic purchase confirmation messages, determine purchase amounts and purchase categories from the electronic purchase confirmation messages, e.g., via one or more classifiers based upon a machine learning algorithm, update a user purchase profile, and perform an automated action in accordance with the user purchase profile that is updated. In one example, this leads to more efficient operating of a telecommunication network. In addition, in one example, a user is also provided greater insight into his or her purchasing in a variety of categories and with a variety of merchants over various time periods.

The present disclosure also provides a transformation of data, e.g., electronic messages generated by various devices in a telecommunication system may be gathered, analyzed, and transformed into additional data or new data comprising one or more classifiers that may be used to determine purchase categories. In addition, new data is generated insofar as the updating of a user purchase profile may cause new instructions to be generated and sent to cause automated actions to be performed, such as deploying or activating new network components.

Finally, examples of the present disclosure improve the functioning of a computing device, e.g., a server Namely, a server deployed in the telecommunication network or in a network of another service provider, is improved by the use of electronic messages of a user that are collected and processed via the operations of the present disclosure to determine which of the electronic messages are electronic purchase confirmation messages, to automatically determine purchase amounts and purchase categories from the electronic purchase confirmation messages, e.g., via one or more classifiers based upon a machine learning algorithm, to update a user purchase profile, and to perform an automated action in accordance with the user purchase profile that is updated. Furthermore, in an example where operations of the present disclosure are implemented in a server of a telecommunication network, the telecommunication network may also be transformed into a different state and/or have a different physical composition via the automatic allocation of one or more network resources in accordance with examples of the present disclosure.

Figure 5:
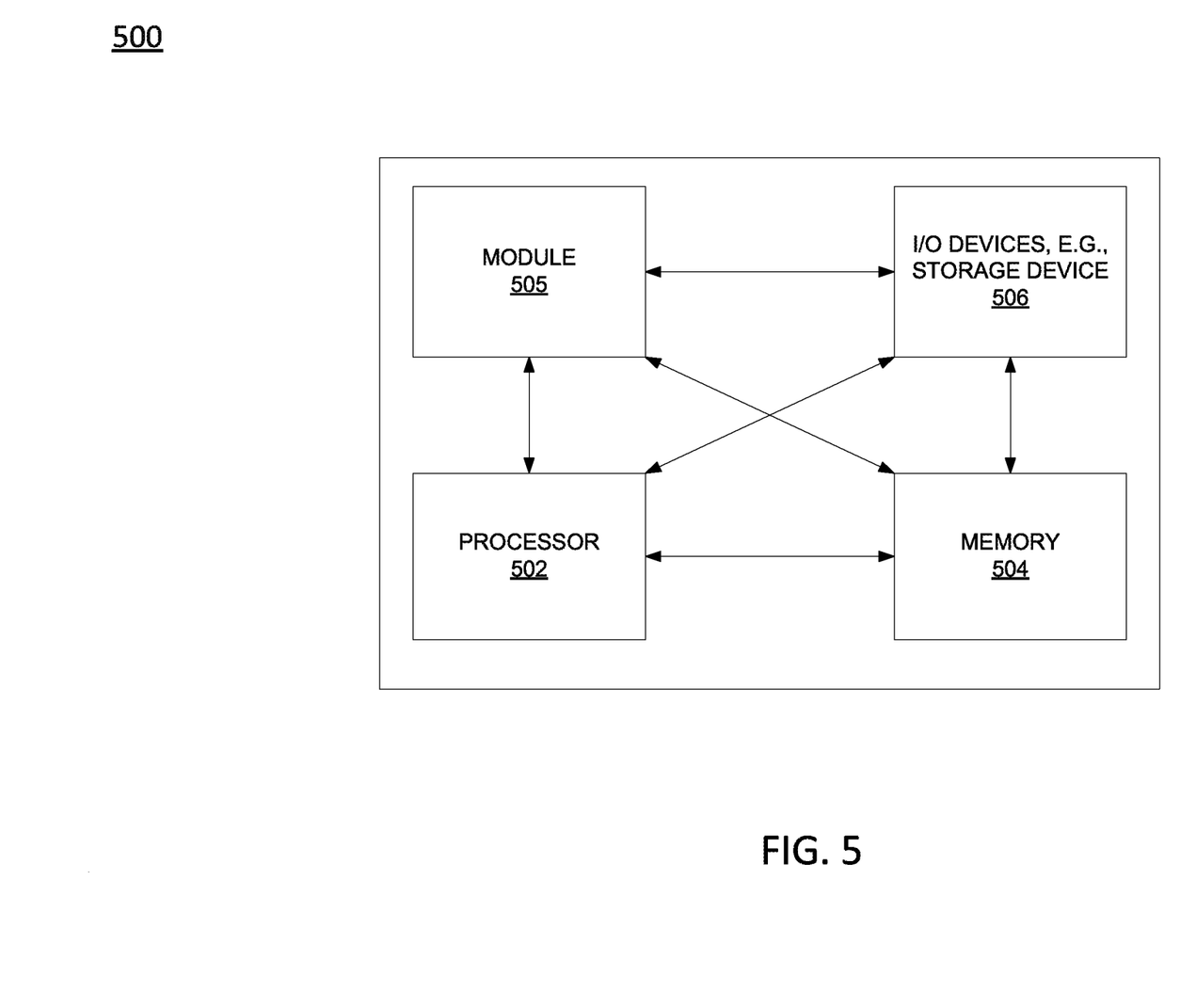
FIG. 5 illustrates a high-level block diagram of a computing device specially programmed to perform the functions described herein.

FIG. 5 depicts a high-level block diagram of a computing device specifically programmed to perform the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for identifying electronic purchase confirmation messages in a plurality of electronic messages for a user, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 502 can also be configured or programmed to cause other devices to perform one or more operations as discussed above. In other words, the one or more hardware processors 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 505 for identifying electronic purchase confirmation messages in a plurality of electronic messages for a user (e.g., a software program comprising computer-executable instructions) can be loaded into memory 504 and executed by hardware processor element 502 to implement the steps, functions or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for identifying electronic purchase confirmation messages in a plurality of electronic messages for a user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A device, comprising:
a processor; and
a computer-readable storage medium storing instructions which, when executed by the processor, cause the processor to perform operations, the operations comprising:
obtaining an authorization to identify electronic purchase confirmation messages in a plurality of electronic messages for a user and to maintain a user purchase profile of the user;
collecting the plurality of electronic messages for the user;
identifying the electronic purchase confirmation messages in the plurality of electronic messages;
determining a purchase category and a purchase amount from each of the electronic purchase confirmation messages that is identified;
obtaining a verification of the purchase category that is determined from each of the electronic purchase confirmation messages that is identified;
updating the user purchase profile in accordance with the purchase category and the purchase amount from each of the electronic purchase confirmation messages that is identified; and
performing an automated action in accordance with the user purchase profile that is updated, wherein the performing the automated action comprises:
disabling a network resource of a telecommunication network based upon the user purchase profile; or
allocating the network resource of the telecommunication network based upon the user purchase profile.

2. The device of claim 1, wherein the plurality of electronic messages includes at least one of:
an email;
a short message service message; or
a message of an over-the-top messaging application.

3. The device of claim 2, wherein the plurality of electronic messages for the user is obtained from at least one of:
an email server;
a short message service server;
a server of the over-the-top messaging application; or
an electronic device of the user.

4. The device of claim 1, wherein the identifying the electronic purchase confirmation messages in the plurality of electronic messages comprises identifying at least one of purchase confirmation related: words, phrases, symbols, or monetary character sets.

5. The device of claim 1, wherein the plurality of electronic messages includes electronic messages from at least one of:
a server of a merchant engaging in a sale with the user; or
a server of a payment processing entity processing a payment for a purchase of the user.

6. The device of claim 1, wherein the performing the automated action further comprises:
restricting a usage of an account by the user based upon the user purchase profile.

7. The device of claim 1, wherein the performing the automated action further comprises:
restricting access by an electronic device of the user to a merchant website, based upon the user purchase profile.

8. The device of claim 1, wherein the performing the automated action further comprises:
automatically ordering an item from a merchant for the user based upon the user purchase profile.

9. The device of claim 1, wherein the operations further comprise:
presenting, via a dashboard interface on an electronic device of the user, the user purchase profile that is updated.

10. The device of claim 9, wherein the verification of the purchase category that is determined from each of the electronic purchase confirmation messages that is identified is obtained from the user via the dashboard interface.

11. The device of claim 1, wherein the operations further comprise:
receiving a rule for the automated action.

12. The device of claim 11, wherein the rule is received via a dashboard interface from the user or from an account holder associated with the user.

13. The device of claim 1, wherein the authorization is obtained from the user.

14. The device of claim 1, wherein the authorization is obtained from an account holder associated with the user.

15. The device of claim 1, wherein the verification is obtained from an account holder associated with the user.

16. The device of claim 1, wherein the purchase category from each of the electronic purchase confirmation messages that is identified is determined in accordance with a plurality of purchase categories provided by the user.

17. The device of claim 1, wherein the purchase category from each of the electronic purchase confirmation messages that is identified is determined in accordance with a plurality of purchase categories provided by an account holder associated with the user.

18. A method, comprising:
obtaining, by a processor, an authorization to identify electronic purchase confirmation messages in a plurality of electronic messages for a user and to maintain a user purchase profile of the user;
collecting, by the processor, the plurality of electronic messages for the user;
identifying, by the processor, the electronic purchase confirmation messages in the plurality of electronic messages;
determining, by the processor, a purchase category and a purchase amount from each of the electronic purchase confirmation messages that is identified;
obtaining, by the processor, a verification of the purchase category that is determined from each of the electronic purchase confirmation messages that is identified;
updating, by the processor, the user purchase profile in accordance with the purchase category and the purchase amount from each of the electronic purchase confirmation messages that is identified; and
performing, by the processor, an automated action in accordance with the user purchase profile that is updated, wherein the performing the automated action comprises:
disabling a network resource of a telecommunication network based upon the user purchase profile; or
allocating the network resource of the telecommunication network based upon the user purchase profile.

19. The method of claim 18, wherein the plurality of electronic messages includes at least one of:
an email;
a short message service message; or
a message of an over-the-top messaging application.

20. A non-transitory computer-readable medium storing instructions which, when executed by a processor, cause the processor to perform operations, the operations comprising:
- obtaining an authorization to identify electronic purchase confirmation messages in a plurality of electronic messages for a user and to maintain a user purchase profile of the user;
- collecting the plurality of electronic messages for the user;
- identifying the electronic purchase confirmation messages in the plurality of electronic messages;
- determining a purchase category and a purchase amount from each of the electronic purchase confirmation messages that is identified;
- obtaining a verification of the purchase category that is determined from each of the electronic purchase confirmation messages that is identified;
- updating the user purchase profile in accordance with the purchase category and the purchase amount from each of the electronic purchase confirmation messages that is identified; and
- performing an automated action in accordance with the user purchase profile that is updated, wherein the performing the automated action comprises:
  - disabling a network resource of a telecommunication network based upon the user purchase profile; or
  - allocating the network resource of the telecommunication network based upon the user purchase profile.

* * * * *